US011305761B2

(12) United States Patent
Miyamoto et al.

(10) Patent No.: US 11,305,761 B2
(45) Date of Patent: Apr. 19, 2022

(54) COLLISION AVOIDANCE CONTROL APPARATUS

(71) Applicant: Toyota Jidosha Kabushiki Kaisha, Toyota (JP)

(72) Inventors: Yuhei Miyamoto, Toyota (JP); Kohei Morotomi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 290 days.

(21) Appl. No.: 16/777,111

(22) Filed: Jan. 30, 2020

(65) Prior Publication Data
US 2020/0247398 A1 Aug. 6, 2020

(30) Foreign Application Priority Data
Feb. 4, 2019 (JP) .............................. JP2019-018062

(51) Int. Cl.
| | |
|---|---|
| *B60W 30/09* | (2012.01) |
| *G01S 13/931* | (2020.01) |
| *G01S 13/42* | (2006.01) |
| *G01S 13/86* | (2006.01) |
| *B60Q 9/00* | (2006.01) |

(52) U.S. Cl.
CPC ............. *B60W 30/09* (2013.01); *G01S 13/42* (2013.01); *G01S 13/867* (2013.01); *G01S 13/931* (2013.01); *B60Q 9/008* (2013.01); *B60W 2420/42* (2013.01); *B60W 2420/52* (2013.01); *G01S 2013/9322* (2020.01); *G01S 2013/93185* (2020.01)

(58) Field of Classification Search
CPC ............................. B60W 30/09; G01S 13/867
See application file for complete search history.

(56) References Cited

U.S. PATENT DOCUMENTS

| | | | |
|---|---|---|---|
| 2012/0106786 A1 | 5/2012 | Shiraishi et al. | |
| 2017/0225617 A1 | 8/2017 | Morimura et al. | |
| 2018/0156913 A1* | 6/2018 | Baba | ....................... G01S 7/411 |
| 2019/0009774 A1 | 1/2019 | Yamashita et al. | |
| 2019/0232956 A1* | 8/2019 | Takaki | .................. G01S 13/867 |

FOREIGN PATENT DOCUMENTS

| | | |
|---|---|---|
| JP | 2010-271788 A | 12/2010 |
| JP | 2017-043173 A | 3/2017 |
| JP | 2017-138817 A | 8/2017 |

* cited by examiner

*Primary Examiner* — Peter D Nolan
*Assistant Examiner* — Tarek Elarabi
(74) *Attorney, Agent, or Firm* — Dinsmore & Shohl LLP

(57) ABSTRACT

Provided is a collision avoidance control apparatus for a vehicle including a first sensor configured to detect a first object present in a first area; a second sensor configured to detect a second object present in a second area; and a controller configured to execute collision avoidance control when determining the first object and the second object as the same object, in which the controller is further configured to determine the first object and the second object as the same object when determining that the first object enters the first area, and determining that at least part of the second object is present in a specific region, the specific region being a region which includes a first object region in which the first object exists, and which includes a part of a region contiguous to the first object region and outside of the first area.

4 Claims, 12 Drawing Sheets

COLLISION AVOIDANCE CONTROL APPARATUS

CROSS-REFERENCES TO RELATED APPLICATION

The present application claims priority to Japanese patent application No. JP 2019-18062 filed on Feb. 4, 2019, the content of which is hereby incorporated by reference in its entirety.

BACKGROUND

1. Technical Field

The present disclosure relates to a collision avoidance control apparatus for a vehicle configured to execute collision avoidance control when there is an object in a peripheral region of the vehicle.

2. Description of the Related Art

Hitherto, there has been proposed a collision avoidance control apparatus for a vehicle configured to execute collision avoidance control when there is a high possibility that the vehicle collides with a three-dimensional object (target object) existing in a peripheral region of the vehicle (see Japanese Patent Application Laid-open No. 2017-043173, and Japanese Patent Application Laid-open No. 2010-271788).

Such collision avoidance control is also called "pre-collision safety control (PCS)" or "pre-crash safety control (PCS)". The collision avoidance control includes alert control for alerting a driver to the possibility of a collision, driving force suppression control for suppressing a driving force of the vehicle, and braking force control for applying a braking force to wheels of the vehicle.

An apparatus (hereinafter, referred to as a "related-art apparatus") disclosed in Japanese Patent Application Laid-open No. 2010-271788 determines whether or not there is an object in front of the vehicle through use of a first sensor and a second sensor. The first sensor is configured to take/capture an image in a front range of the vehicle to detect an object, and is a monocular camera, for example. The second sensor is configured to radiate an electromagnetic wave in a front region of the vehicle to detect a reflected wave from an object, and is a radar sensor (millimeter-wave radar sensor), for example. When the first sensor and the second sensor both detect the same object, the related-art apparatus determines that there is a high possibility that the object exists actually. Therefore, the related-art apparatus executes the collision avoidance control for the object as necessary.

In one configuration example, an area (hereinafter, referred to as a "first area") in which the first sensor can detect an object is narrower than an area (hereinafter, referred to as a "second area") in which the second sensor can detect an object. In this example, when an other vehicle enters the first area from the side, a front part of the other vehicle first enters the first area, and therefore, the first sensor detects the "front part of the other vehicle" as an object. However, the second sensor may receive an electromagnetic wave reflected from only a part of the object (other vehicle) without receiving electromagnetic waves reflected from the whole of the object. It is assumed that, at the time point at which the front part of the other vehicle enters the first area, the second sensor does not receive reflected waves from the front part of the other vehicle. In this case, the related-art apparatus does not determine that the first sensor and the second sensor detect the same object, and therefore, the related-art apparatus does not execute the collision avoidance control for the object. Therefore, there is a possibility that the vehicle becomes fairly close to the other vehicle.

SUMMARY

The present disclosure provides a collision avoidance control apparatus configured to, at a time point immediately after an object starts entering the first area, determine whether or not an object detected by the first sensor and an object detected by the second sensor are the same object to thereby execute the collision avoidance control in an appropriate situation.

A collision avoidance control apparatus for a vehicle according to one embodiment includes: a first sensor configured to capture a predetermined first area in a peripheral region of the vehicle to acquire image data, detect as a first object an object present in the first area through use of the image data, and acquire first detection information which is information on the detected first object; a second sensor configured to, through use of an electromagnetic wave, detect as a second object an object present in a predetermined second area in the peripheral region of the vehicle, and acquire second detection information which is information on the detected second object, the second area including the first area and being larger than the first area; and a controller configured to execute collision avoidance control for avoiding a collision when determining the first object and the second object as the same object based on the first detection information and the second detection information, and determining the first object as an obstacle which is likely to collide with the vehicle based on one or both of the first detection information and the second detection information.

For example, in a situation in which an other vehicle enters the first area (e.g., a front region of the vehicle) from the side, the first sensor detects as the first object a part of the other vehicle present in the first area at a time point at which the part of the other vehicle enters the first area. At that time, it is assumed that, although the second sensor cannot detect the part of the other vehicle, the second sensor detects as the second object the remaining part (e.g., a center side portion) of the other vehicle positioned outside of the first area. In this case, it is not determined that the first object and the second object are the same object. Therefore, the collision avoidance control is not executed for the other vehicle.

In view of the above, the controller is further configured to determine whether or not a specific condition is satisfied based on the first detection information. The specific condition is satisfied when the first object enters the first area from outside of the first area. Further, the controller is configured to determine the first object and the second object as the same object when determining that the specific condition is not satisfied, and determining that at least part of the second object is present in a first object region in which the first object exists. Furthermore, the controller is configured to determine the first object and the second object as the same object when determining that the specific condition is satisfied, and determining that at least part of the second object is present in a specific region. The specific region is a region which includes the first object region, and which includes a part of a region contiguous to the first object region and outside of the first area.

As described above, the collision avoidance control apparatus sets the specific region in the above-mentioned situation (that is, at the time point at which the part of the other vehicle enters the first area). The specific region is a region which includes the first object region where the first object exists, and which includes a part of a region contiguous to the first object region and outside of the first area. When at least part of the second object is present in the specific region, the collision avoidance control apparatus determines the first object and the second object as the same object. In the above-mentioned situation, the collision avoidance control apparatus can increase the possibility that the first object and the second object are determined to be the same object.

In the above-manner, at a time point immediately after the object (other vehicle) starts entering the first area, the collision avoidance control apparatus can accurately determine whether the first object and the second object are the same object. Therefore, the collision avoidance control is executed at the time point immediately after the object (other vehicle) starts entering the first area. Accordingly, it is possible to prevent the vehicle from moving closer to the other vehicle.

In one aspect of the collision avoidance control apparatus, the controller is configured to set as the specific region a region obtained by enlarging the first object area in a direction opposite to a moving direction of the first object.

At the time point at which the part of the other vehicle enters the first area as described above, the remaining part of the other vehicle is present so as to extend from a position where the other vehicle enters the first area in a direction opposite to a moving direction of the other vehicle. The controller according to this aspect enlarges the first object region in an appropriate direction in accordance with the moving direction of the first object (other vehicle) to thereby set the specific region. Therefore, it is possible to increase the possibility that the second object to be regarded as the same object as the first object is included in the specific region.

In one aspect of the collision avoidance control apparatus, the first sensor is configured to determine a category of the first object based on the image data. Further, the controller is configured to change a size of a region outside of the first area in the specific region in accordance with the determined category of the first object.

For example, the second sensor may acquire the second detection information on an object (also referred to as "ghost object") that does not actually exist, due to multiple reflections of a reflected wave from an object. When the size of the region outside of the first area in the specific region is too large, there is a possibility that the second object (ghost object) which should not be regarded as the same object as the first object is included in the specific region. In view of the above, the controller according to this aspect changes the size of the region outside of the first area in the specific region in accordance with the category of the first object. Therefore, it is possible to reduce the possibility that the second object which should not be regarded as the same object as the first object is included in the specific region.

On the other hand, in a case where the first object is a relatively large object such as a bus and a truck, when the size of the region outside of the first area in the specific region is too small, there is a possibility that at least part of the second object is not included in the specific region. In view of the above, the controller according to this aspect changes the size of the region outside of the first area in the specific region in accordance with the category of the first object. Therefore, it is also possible to increase the possibility that the second object which should be regarded as the same object as the first object is included in the specific region.

According to one or more embodiments, the above-mentioned controller is implemented by a microprocessor programmed for performing one or more operations and/or functionality described herein. In addition, the controller may be implemented, in whole or in part, by specifically configured to hardware (e.g., by one or more application specific integrated circuits or ASIC(s)).

Further features relating to the present disclosure become apparent from the description herein and the accompanying drawings. Problems, configurations, and effects other than those described above become apparent from the following description of an embodiment and modification examples.

In the above description, in order to facilitate understanding of the present disclosure, a name and/or reference numeral used in the embodiments described later is enclosed in parentheses and assigned to each of the constituent features corresponding to the embodiments. However, each of the constituent features is not limited to the embodiments defined by the name and/or reference numeral.

DETAILED DESCRIPTION

Now, referring to the accompanying drawings, a description is given of an embodiment. The accompanying drawings are illustrations of a specific embodiment, but those illustrations are examples to be used for the understanding of the embodiment, and are not to be used to limit the interpretation of the present disclosure.

A collision avoidance control apparatus (hereinafter, simply referred to as an "apparatus") according to an embodiment of the present disclosure is applied to a vehicle (automobile). The vehicle to which the apparatus is applied may be referred to as an "own vehicle" for distinction from other vehicles.

Figure 1:
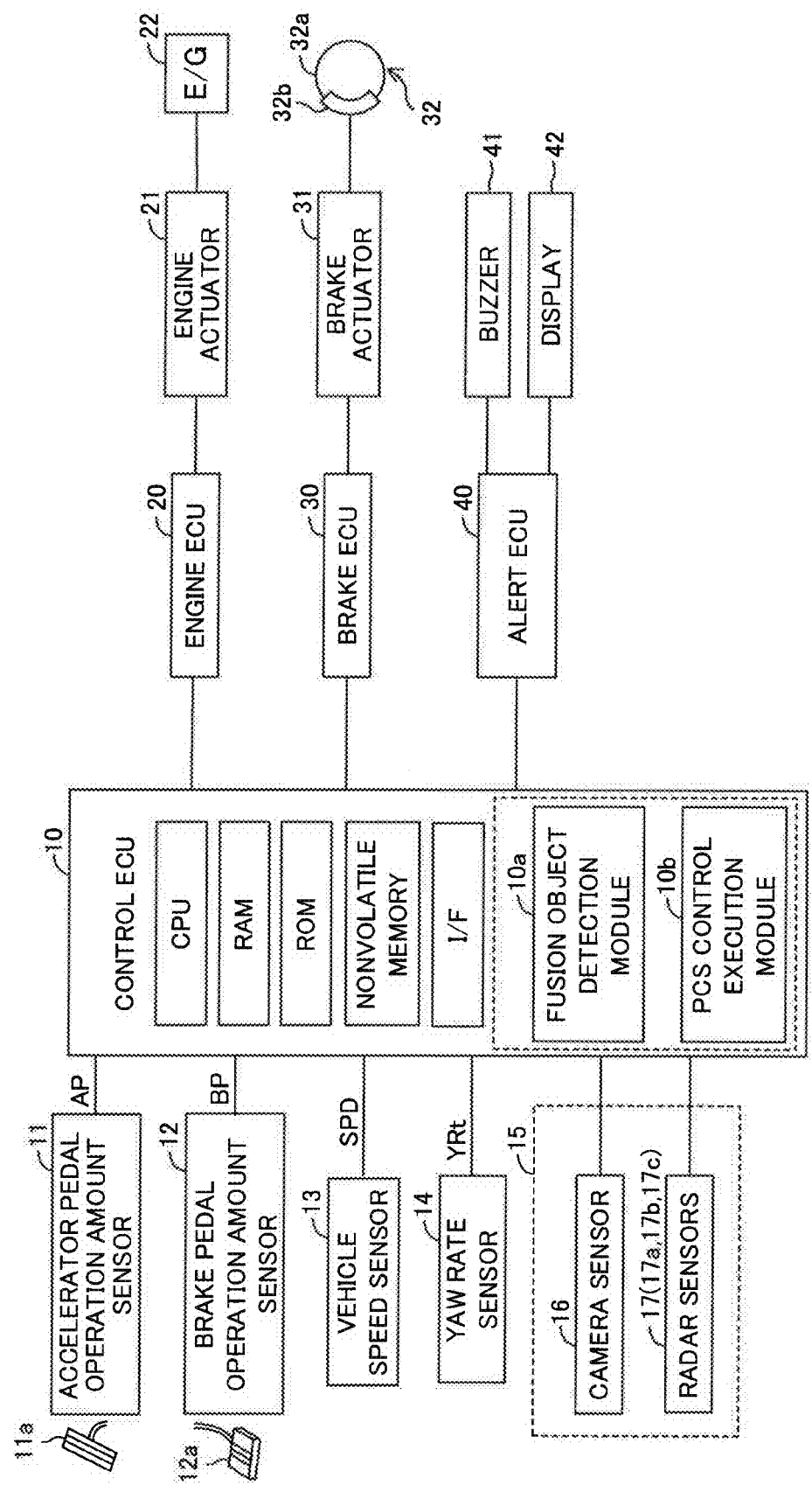
FIG. 1 is a schematic configuration diagram of a collision avoidance control apparatus for a vehicle according to an embodiment.

As illustrated in FIG. 1, the apparatus includes a control ECU 10, an engine ECU 20, a brake ECU 30, and an alert ECU 40.

The above-mentioned ECUs are electric control units each including a microcomputer as a main part, and are connected to one another so as to be able to mutually transmit and receive information via a controller area network (CAN) (not shown). The microcomputer herein includes a CPU, a RAM, a ROM, a nonvolatile memory, an interface I/F, and the like. The CPU executes instructions (programs and routines) stored in the ROM to realize various functions described later. In addition, two or more ECUs among the above-mentioned ECUs may be integrated into one ECU.

The control ECU 10 is electrically connected to sensors described later, and receives detection signals or output signals of the sensors, respectively. The sensors may be electrically connected to any of the ECUs other than the control ECU 10. In this case, the control ECU 10 receives the detection signals or the output signals of the sensors from the ECUs electrically connected to the sensors via the CAN.

An acceleration pedal operation amount sensor 11 detects an operation amount (accelerator opening) AP of an acceleration pedal 11a of the vehicle and outputs a detection signal or an output signal indicative of the operation amount AP to the control ECU 10. A brake pedal operation amount sensor 12 detects an operation amount BP of a brake pedal 12a of the vehicle, and outputs a detection signal or an output signal indicative of the operation amount BP to the control ECU 10.

A vehicle speed sensor 13 detects a traveling speed (vehicle speed) SPD of the vehicle and outputs a detection signal or an output signal indicative of the vehicle speed SPD to the control ECU 10. A yaw rate sensor 14 detects a yaw rate YRt of the vehicle and outputs a detection signal or an output signal indicative of the actual yaw rate YRt to the control ECU 10.

Hereinafter, "information on a traveling state of the vehicle" output from the acceleration pedal operation amount sensor 11, the brake pedal operation amount sensor 12, the vehicle speed sensor 13 and the yaw rate sensor 14 will be also referred to as "traveling state information".

An ambient sensor 15 includes a camera sensor 16, and a plurality of radar sensors 17a, 17b and 17c. The ambient sensor 15 is configured to acquire information on three-dimensional objects present in a peripheral region of the vehicle. The peripheral region herein includes a front region, a right side region and a left side region, as described later. The three-dimensional objects include, for example, moving objects such as pedestrians, two-wheel vehicles, four-wheel vehicles and the like, and motionless objects such as power poles, trees, guardrails and the like. Hereinafter, the three-dimensional object will be simply referred to as an "object".

The ambient sensor 15 is configured to calculate information on an object (hereinafter, referred to as "object information") to output the object information to the control ECU 10.

Figure 2:
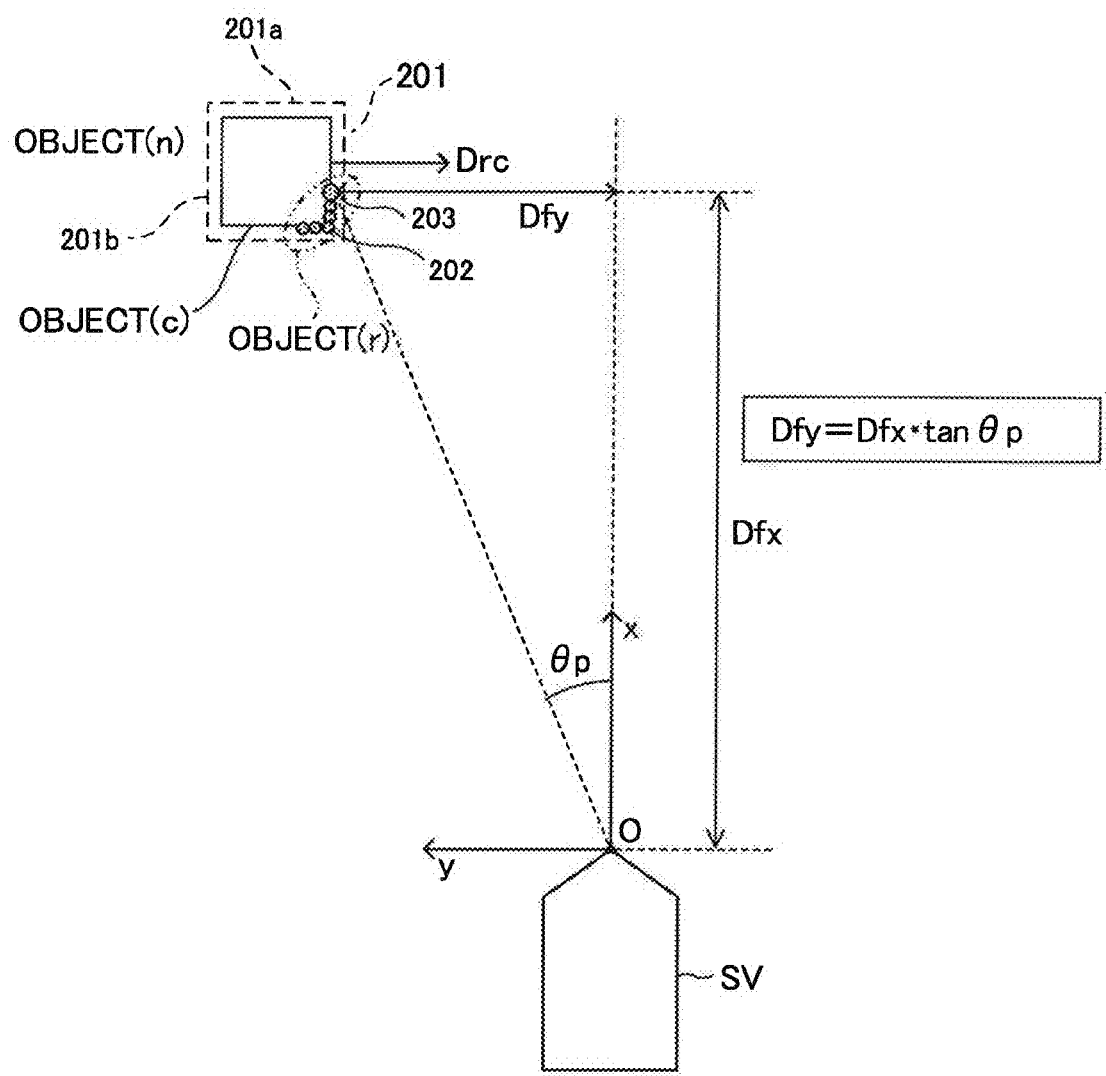
FIG. 2 is a diagram for illustrating object information (a longitudinal distance of an object, an azimuth orientation of the object, and the like) acquired by an ambient sensor illustrated in FIG. 1.

As illustrated in FIG. 2, the ambient sensor 15 acquires the object information based on a predefined x-y coordinate system. The origin of the x-y coordinate system is a center position O in a vehicle width direction of a front end portion of the vehicle SV. The x-axis is a coordinate axis which extends along a front-rear direction of the vehicle SV, and passes through the center position O in the vehicle width direction of the front end portion of the vehicle SV. A positive value of the x-axis indicates a position on the front side of the origin meanwhile a negative value of the x-axis indicates a position on the rear side of the origin. The y-axis is a coordinate axis orthogonal to the x-axis. A positive value of the y-axis indicates a position on the left side of the origin meanwhile a negative value of the y-axis indicates a position on the right side of the origin. The x-coordinate position of the x-y coordinate system is referred to as a "longitudinal distance Dfx", and the y-coordinate position of the x-y coordinate system is referred to as a "lateral position Dfy".

The longitudinal distance $Dfx(n)$ of an object (n) is a signed distance between the origin O and the object (n) in the central axis direction (i.e., x-axis direction) of the vehicle SV.

The lateral position $Dfy(n)$ of the object (n) is a signed distance between the origin O and the object (n) in a direction (i.e., y-axis direction) perpendicular to the central axis of the vehicle SV.

A relative speed $Vfx(n)$ of the object (n) is a difference between a speed Vs of the object (n) and a speed Vj (=SPD) of the vehicle SV (that is, $Vfx(n)=Vs-Vj$). The speed Vs of the object (n) is a speed of the object (n) in the central axis direction (x-axis direction) of the vehicle SV.

The object information on the object (n) includes the longitudinal distance $Dfx(n)$, the lateral position $Dfy(n)$, and the relative speed $Vfx(n)$. As illustrated in FIG. 2, the lateral position $Dfy(n)$ can be obtained based on an azimuth orientation $\theta p$ of the object (n) and the longitudinal distance $Dfx(n)$. Therefore, the object information may include the azimuth orientation $\theta p$ of the object (n) with respect to the vehicle SV in place of the lateral position $Dfy(n)$.

The camera sensor 16 includes a camera and an image processor. The camera is a monocular camera or a stereo camera. The camera sensor 16 may be referred to as a "first sensor".

Figure 3:
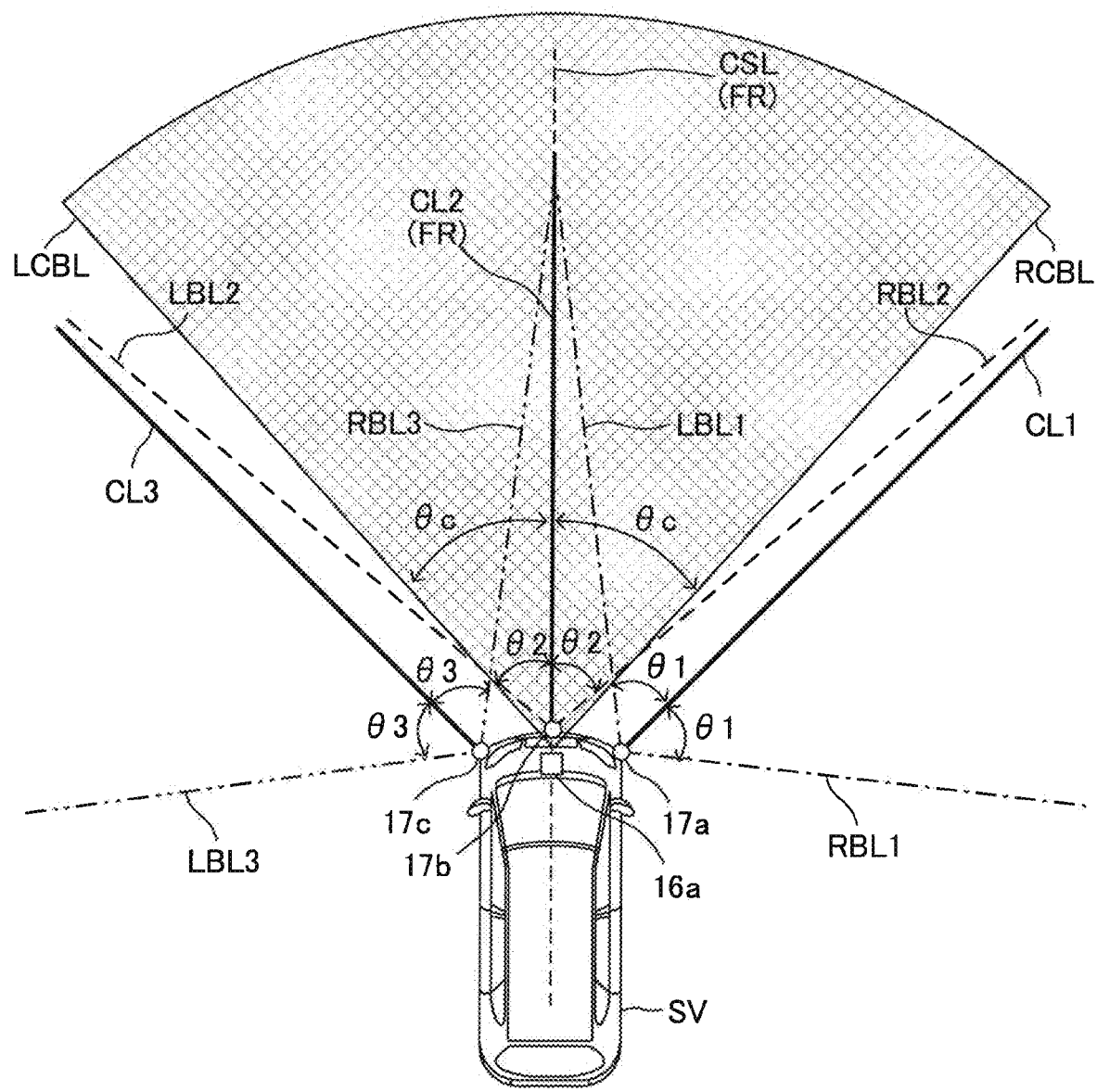
FIG. 3 is a diagram for illustrating detectable areas (detectable ranges) of a camera sensor and a plurality of radar sensors illustrated in FIG. 1.

As illustrated in FIG. 3, a camera 16a is disposed at a central position of a front part of the vehicle SV. The camera 16a captures an image of a predetermined range (front range of the vehicle SV) in surroundings of the vehicle SV to acquire image data. An area (detectable area) in which the camera sensor 16 can detect an object is a fan-shaped area having a detection axis CSL as a central axis extending from the central position of the front part of the vehicle SV in the front direction. The fan-shaped area includes an area from the detection axis CSL to the right side to a right boundary line RCBL, and an area from the detection axis CSL to the left side to a left boundary line LCBL. The detection axis CSL overlaps a longitudinal axis FR of the vehicle SV. An "angle between the detection axis CSL and the right boundary line RCBL" and an "angle between the detection axis CSL and the left boundary line LCBL" are "$\theta c$". Thus, an angle of view of the camera 16a is "$2\cdot\theta c$". The detectable area of the camera sensor 16 may be referred to as a "camera detection area (or first area)".

The camera 16a captures the camera detection area at a predetermined frame rate, and outputs the captured image data to the image processor. The image processor detects an object present in the camera detection area based on the image data, and identifies (determines) a category/type of the detected object. Examples of the category of the object include the four-wheel vehicle, the two-wheel vehicle, the pedestrian, and the like. The image processor stores data obtained by patterning objects such as four-wheel vehicles, two-wheel vehicles, and pedestrians in a memory (for example, the ROM) in advance. The image processor determines whether the detected object corresponds to the four-wheel vehicle, the two-wheeled vehicle, or the pedestrian by performing pattern matching on the image data. Hereinafter, the object detected by the camera sensor 16 is referred to as an "object (c)" or "camera-detected object (c)".

The image processor calculates (acquires) the object information on the object (c) based on the image data. The object information on the object (c) includes the longitudinal distance Dfx of the object (c), the azimuth orientation θp of the object (c) with respect to the vehicle SV, the relative speed Vfx of the object (c) with respect to the vehicle SV, and the like. Further, the image processor calculates an optical flow from the image data of frames which are temporally continuous. The image processor acquires a relative movement vector of the object (c) with respect to the vehicle SV (that is, a moving direction of the object (c)) based on the optical flow. The image processor transmits "camera-sensor detection information" to the control ECU 10. The camera-sensor detection information includes the image data, the category of the object (c), the object information on the object (c), and the moving direction of the object (c). The camera-sensor detection information may be referred to as "first detection information".

As illustrated in FIG. 3, the radar sensor 17a is disposed at a right corner portion of the front part of the vehicle SV, the radar sensor 17b is disposed at a center portion in the vehicle width direction of the front part of the vehicle SV, and the radar sensor 17c is disposed at a left corner portion of the front part of the vehicle SV. The radar sensors 17a, 17b and 17c are collectively referred to as "radar sensors 17" unless it is required to distinguish between those sensors. In addition, the radar sensors 17 may be referred to as "second sensors".

Each of the radar sensors 17 includes a radar transceiver (radar transmitting/receiving part) (not shown) and an information processor (not shown). The radar transceiver radiates an electromagnetic wave (e.g., radio wave in a millimeter waveband). Hereinafter, the radio wave in the millimeter waveband is simply referred to as a "millimeter wave". The radar transceiver receives a millimeter wave (i.e., reflected wave) reflected by an object (three-dimensional object) present within a radiation range. In addition, the radar sensors 17 may be radar sensors configured to radiate and receive a radio wave in a frequency band other than the millimeter waveband.

The information processor detects an object based on reflection point information. The reflection point information includes a phase difference between the transmitted millimeter wave and the received reflected wave, an attenuation level of the reflected wave, a time period required from transmission of the millimeter wave to reception of the reflected wave, and other information. As illustrated in FIG. 2, the information processor groups "a plurality of reflection points of millimeter waves" which are close to each other (or are close to each other and are moving in the same direction). The information processor detects the grouped reflection points (hereinafter referred to as a "group of reflection points") 202 as one object. Hereinafter, the object detected by the radar sensor(s) 17 is referred to as an "object (r)" or "radar-detected object (r)".

The information processor calculates (acquires) the object information on the object (r) based on the reflection point information. As illustrated in FIG. 2, the information processor calculates the object information by using a point (representative reflection point) 203 in the group of reflection points 202. The object information on the object (r) includes the longitudinal distance Dfx of the object (r), the azimuth orientation θp of the object (r) with respect to the vehicle SV, the relative speed Vfx of the object (r) with respect to the vehicle SV, and other information. The information processor transmits the object information on the object (r) as "radar-sensor detection information" to the control ECU 10. The radar-sensor detection information may be referred to as "second detection information".

In one embodiment, the representative reflection point 203 is a reflection point having the highest reflection intensity in the group of reflection points 202. The representative reflection point 203 is not limited to this example. The representative reflection point 203 may be a left end point in the group of reflection points 202, a right end point in the group of reflection points 202, or a reflection point located in the middle between the left end point and the right end point.

As illustrated in FIG. 3, a detectable area of the radar sensor 17a is a fan-shaped area having a detection axis CL1 as a central axis extending from the right corner portion of the front part of the vehicle SV in a front-right direction. The fan-shaped area includes an area from the detection axis CL1 to the right side to a right boundary line RBL1, and an area from the detection axis CL1 to the left side to a left boundary line LBL1. A radius of the fan-shaped area is a specific distance. An "angle between the detection axis CL1 and the right boundary line RBL1" and an "angle between the detection axis CL1 and the left boundary line LBL1" are "θ1". Thus, a central angle of the fan-shaped area which is the detectable area of the radar sensor 17a is "2·θ1". The radar sensor 17a detects as the object (r) an object present in the right side region of the vehicle SV, and acquires (calculates) first radar-sensor detection information on the object (r).

A detectable area of the radar sensor 17b is a fan-shaped area having a detection axis CL2 as a central axis extending from the center portion in the vehicle width direction of the front part of the vehicle SV in the front direction. The fan-shaped area includes an area from the detection axis CL2 to the right side to a right boundary line RBL2, and an area from the detection axis CL2 to the left side to a left boundary line LBL2. A radius of the fan-shaped area is the above-mentioned specific distance. The detection axis CL2 overlaps the longitudinal axis FR of the vehicle SV. An "angle between the detection axis CL2 and the right boundary line RBL2" and an "angle between the detection axis CL2 and the left boundary line LBL2" are "θ2". Thus, a central angle of the fan-shaped area which is the detectable area of the radar sensor 17b is "2·θ2". The radar sensor 17b detects as the object (r) an object present in the front region of the vehicle SV, and acquires (calculates) second radar-sensor detection information on the object (r).

A detectable area of the radar sensor 17c is a fan-shaped area having a detection axis CL3 as a central axis extending from the left corner portion of the front part of the vehicle SV in a front-left direction. The fan-shaped area includes an area from the detection axis CL3 to the right side to a right boundary line RBL3, and an area from the detection axis CL3 to the left side to a left boundary line LBL3. A radius of the fan-shaped area is the above-mentioned specific distance. An "angle between the detection axis CL3 and the right boundary line RBL3" and an "angle between the detection axis CL3 and the left boundary line LBL3" are "θ3". Thus, a central angle of the fan-shaped area which is the detectable area of the radar sensor 17c is "2·θ3". The radar sensor 17c detects as the object (r) an object present in the left side region of the vehicle SV, and acquires (calculates) third radar-sensor detection information on the object (r). In addition, the angles θ1 to θ3 may be the same angle or different from each other.

Hereinafter, the total area that combines all the detectable areas of the radar sensors 17a to 17c may be referred to as a "radar detection area (or second area)". As understood from FIG. 3, the radar detection area is an area which includes the camera detection area, and is larger than the camera detection area. The control ECU 10 receives the first radar-sensor detection information, the second radar-sensor detection information and the third radar-sensor detection information from the radar sensors 17a to 17c. The control ECU 10 integrates those pieces of the radar-sensor detection information to thereby obtain the (final) radar-sensor detection information.

The control ECU 10 acquires the camera-sensor detection information and the radar-sensor detection information. As described below, the control ECU 10 determines whether or not there is a "specific combination of the object (c) and the object (r)" from among the objects (c) detected based on the camera-sensor detection information and the objects (r) detected based on the radar-sensor detection information. The specific combination herein refers to a combination of the object (c) and the object (r) which can be regarded as the same object. Hereinafter, an object recognized by the specific combination of the object (c) and the object (r) will be referred to as a "fusion object (f)".

Specifically, as illustrated in FIG. 2, the control ECU 10 determines/sets a camera object region (first object region) 201 based on the camera-sensor detection information. The camera object region 201 is a region on the above-mentioned x-y coordinate system, and is a region in which the camera-detected object (c) exists (that is, region surrounding the object (c)). In the present example, the camera object region 201 is a rectangle (or square) having first sides 201a and second sides 201b orthogonal to the first side 201a.

As illustrated in FIG. 2, it is assumed that an object is moving in a direction Drc. The control ECU 10 acquires (calculates) a "length in the moving direction Drc of the object (c)" based on the camera-sensor detection information. Hereinafter, the length in the moving direction Drc of the object (c) is referred to as a "first object length". The control ECU 10 sets a length of the first side 201a to the first object length. The first side 201a may be set to a length longer than the first object length in consideration of the detection error.

Further, the control ECU 10 acquires (calculates) a "length in a direction orthogonal to the moving direction Drc of the object (c)" based on the camera-sensor detection information. Hereinafter, the length in the direction orthogonal to the moving direction Drc of the object (c) is referred to as a "second object length". The control ECU 10 sets a length of the second side 201b to the second object length. The second side 201b may be set to a length longer than the second object length in consideration of the detection error. The control ECU 10 sets the camera object region 201 such that the directions in which the first sides 201a extend match the moving direction Drc of the object (c).

The object (c) may be an object (e.g., a preceding vehicle) which is moving immediately ahead of the vehicle SV in the same direction as the moving direction of the vehicle SV, or an object (e.g., an oncoming vehicle) which is coming toward the vehicle SV. In such a situation, the control ECU 10 cannot acquire the first object length of the object (c) based on the camera-sensor detection information. In this case, the control ECU 10 sets the length of the first side 201a to a predetermined first specific length. Similarly, when the control ECU 10 cannot acquire the second object length of the object (c) based on the camera-sensor detection information, the control ECU 10 sets the length of the second side 201b to a predetermined second specific length.

The control ECU 10 sets the camera object region 201 as a fusion region. Hereinafter, the fusion region is referred to as a "FSN region". The FSN region is a region used for determining whether there is the radar-detected object (r) which can be regarded as the same object as the object (c). The control ECU 10 determines whether or not at least part of the group of reflection points corresponding to the object (r) is included in the FSN region. When at least part of the group of reflection points corresponding to the object (r) is included in the FSN region, the control ECU 10 recognizes the object (c) and the object (r) as the same object (i.e., the fusion object (f)).

When the control ECU 10 has recognized the fusion object (f), the control ECU 10 obtains the object information on the fusion object (f) by integrating the camera-sensor detection information and the radar-sensor detection information. Such integrating processing may be referred to as "fusion processing". The object information on the fusion object (f) includes the longitudinal distance Dfx, the lateral position Dfy, and the relative speed Vfx, and other information.

Specifically, the control ECU 10 adopts the longitudinal distance Dfx included in the radar-sensor detection information as a final longitudinal distance Dfx of the fusion object (f). Further, as illustrated in FIG. 2, the control ECU 10 calculates a final lateral position Dfy of the fusion object (f) based on the longitudinal distance Dfx included in the radar-sensor detection information and the azimuth orientation θp included in the camera-sensor detection information. Specifically, the control ECU 10 obtains the final lateral position Dfy of the fusion object (f) in accordance with the following Expression: Dfy="Dfx of the object (r)"×"tan θp of the object (c)". Furthermore, the control ECU 10 adopts, as a final relative speed Vfx of the fusion object (f), the relative speed Vfx included in the radar-sensor detection information.

As described above, the control ECU 10 includes a "fusion object detection module 10a configured to recognize (detect) the fusion object (f) through use of the camera-sensor detection information and the radar-sensor detection information, and obtain/acquire the object information on the fusion object (f)" implemented by the CPU in terms of function (see FIG. 1).

Referring again to FIG. 1, the engine ECU 20 is electrically connected to an engine actuator 21. The engine actuator 21 includes a throttle valve actuator configured to change an opening degree of a throttle valve of a spark ignition, gasoline fuel injection engine 22. The engine ECU 20 is capable of changing a torque to be generated by the engine 22 by driving the engine actuator 21. A torque generated by the engine 22 is transmitted to drive wheels (not shown) via a transmission (not shown). Thus, the engine ECU 20 is capable of controlling the activation of the engine actuator 21 to control a driving force of the vehicle to thereby change an acceleration or an acceleration state. When the vehicle is a hybrid vehicle, the engine ECU 20 is capable of controlling a driving force of the vehicle to be generated by any one of or both of "an engine and a motor" serving as vehicle driving sources. Further, when the vehicle is an electric vehicle, the engine ECU 20 is capable of controlling a driving force of the vehicle to be generated by a motor serving as a vehicle driving source.

The brake ECU 30 is electrically connected to a brake actuator 31. The brake actuator 31 is provided in a hydraulic circuit provided between a master cylinder (not shown) for pressurizing hydraulic oil by a depression force of the brake pedal 12a and a friction brake mechanism 32 provided in wheels (i.e., right and left front and rear wheels) of the vehicle. The brake actuator 31 adjusts a hydraulic pressure supplied to a wheel cylinder (not shown) in each brake caliper 32b of the friction brake mechanism 32, depending on a command sent from the brake ECU 30. The wheel cylinder is activated by the hydraulic pressure to press a brake pad (not shown) on the brake disc 32a, thereby to generate a friction braking force on the brake disc 32a. Thus, the brake ECU 30 is capable of controlling the activation of the brake actuator 31 to control a braking force applied to the vehicle to thereby change an acceleration or an acceleration state (or deceleration, that is, negative acceleration).

The alert ECU 40 is electrically connected to a buzzer 41 and a display 42. The alert ECU 40 causes the buzzer 41 to output/utter an "alerting sound for alerting the driver that there is an object having a high possibility of a collision with the vehicle SV" in accordance with a command from the control ECU 10. Further, the alert ECU 40 displays a mark/indicator (e.g., warning lamp) for alerting the driver on the display 42 in accordance with a command from the control ECU 10.

<Summary of Pre-Collision Safety Control>

When there is an object (obstacle) which is likely to collide with the vehicle SV, the control ECU 10 is configured to execute well-known pre-collision safety control (collision avoidance control) for avoiding a collision with the object. Hereinafter, the pre-collision safety control is simply referred to as "PCS control".

Specifically, when the control ECU 10 has recognized (detected) the fusion object (f), the control ECU 10 calculates a collision prediction time TTC (Time To Collision) for the fusion object (f). The collision prediction time TTC for the fusion object (f) is a time required for the fusion object (f) to collide with the vehicle SV, and is calculated by dividing the longitudinal distance Dfx of the fusion object (f) by the magnitude of the relative velocity (|Vfx|) of the fusion object (f). When the collision prediction time TTC is equal to or shorter than a predetermined time threshold Tth, the control ECU 10 determines the fusion object (f) as an obstacle having a high possibility of colliding with the vehicle SV. Therefore, the control ECU 10 executes the PCS control.

On the other hand, when only one of the above two types of the sensors (i.e., any one of the camera sensor 16 and the radar sensors 17) detects an object, there is a possibility that the detected object does not actually exist in the peripheral region of the vehicle SV. In this case, the control ECU 10 does not execute the PCS control.

When there are two or more fusion objects, the control ECU 10 calculates the collision prediction time TTC for each fusion object. The control ECU 10 selects a fusion object having the shortest collision prediction time TTC among the calculated TTCs. The control ECU 10 determines whether or not the collision prediction time TTC for the selected fusion object is equal to or shorter than the time threshold Tth. Then, the control ECU 10 determines whether to execute the PCS control based on the determination result for TTC.

The PCS control includes braking force control for applying the braking force to the wheels, driving force suppression control for suppressing the driving force of the vehicle, and alerting control for alerting the driver. Specifically, the control ECU 10 transmits a braking instruction signal to the brake ECU 30. Upon receiving the braking instruction signal from the control ECU 10, the brake ECU 30 controls the brake actuator 31 to apply the braking force to the wheels so that the actual acceleration of the vehicle SV matches (becomes equal to) a target deceleration TG included in the braking instruction signal. Further, the control ECU 10 transmits a drive instruction signal to the engine ECU 20. Upon receiving the drive instruction signal from the control ECU 10, the engine ECU 20 controls the engine actuator 21 to suppress the driving force of the vehicle so that the actual acceleration of the vehicle SV matches (becomes equal to) a target acceleration AG (for example, zero) included in the drive instruction signal. In addition, the control ECU 10 transmits an alert instruction signal to the alert ECU 40. Upon receiving the alert instruction signal from the control ECU 10, the alert ECU 40 causes the buzzer 41 to output/utter the alerting sound and displays the mark for alerting the driver on the display 42. The control for outputting the alerting sound and displaying the mark for alerting may be referred to as "warning control".

As described above, the control ECU 10 includes a "PCS control execution module 10b configured to execute the PCS control" implemented by the CPU in terms of function (see FIG. 1).

<Outline of Operation>

Figure 4:
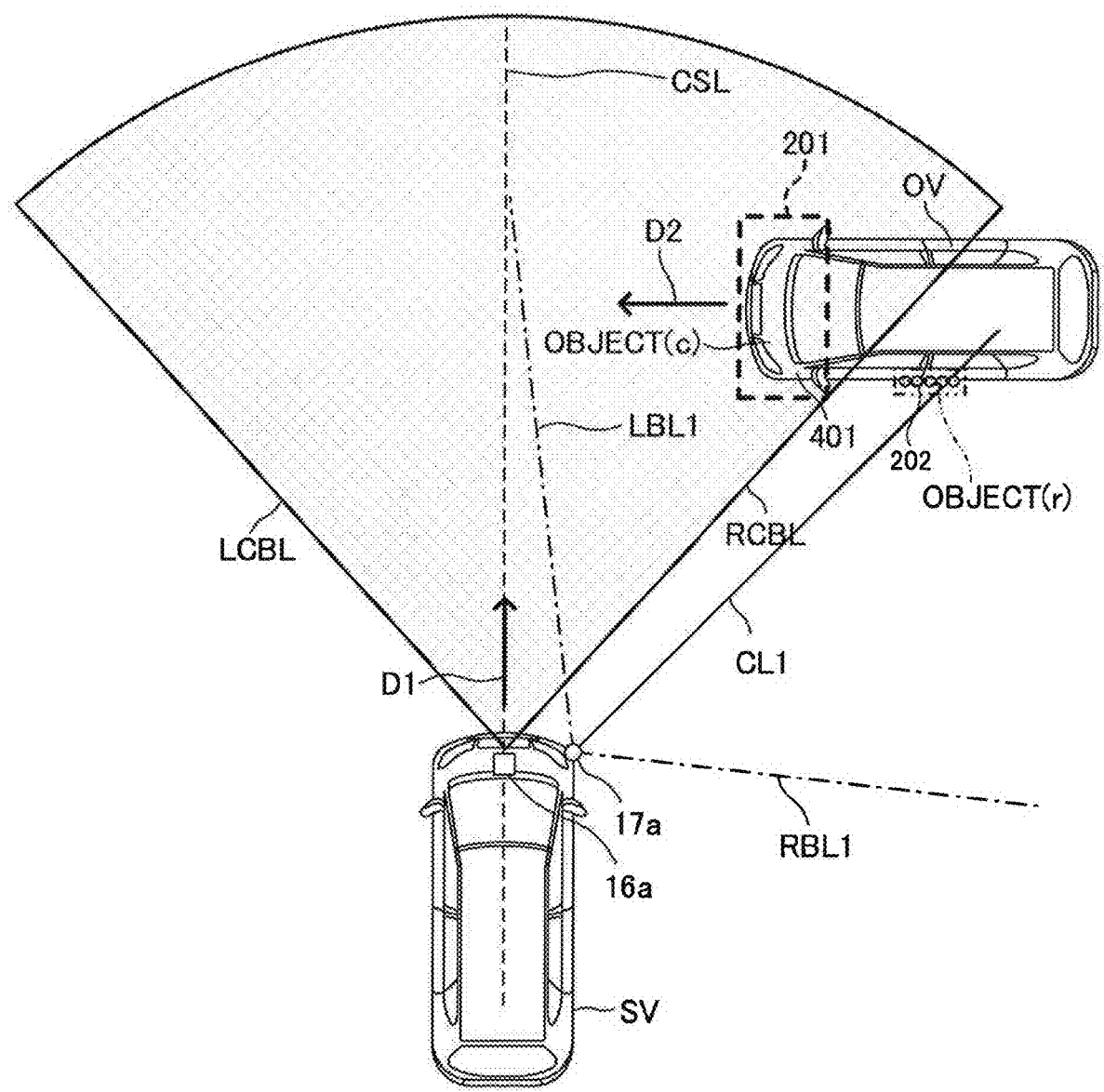
FIG. 4 is a diagram for illustrating a situation in which an other vehicle enters an front region of the vehicle (own vehicle) from a side (right side), and only a part of the other vehicle is included in a camera detection area.
Figure 5:
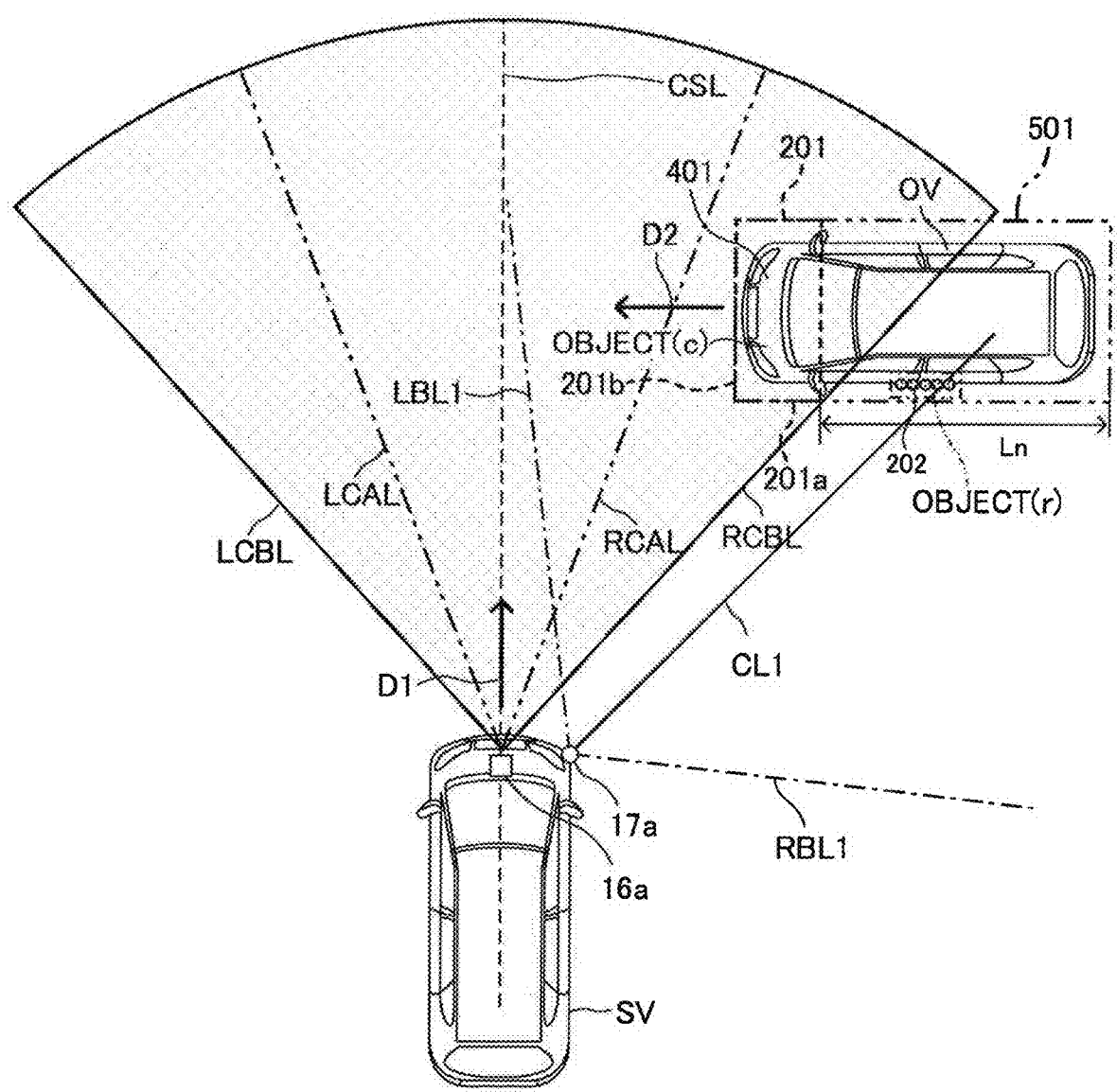
FIG. 5 is a diagram for illustrating a situation in which the other vehicle enters the front region of the own vehicle from the side, and only a part of the other vehicle is included in the camera detection area.

Next, an outline of the operation of the apparatus will be described with reference to FIGS. 4 and 5. In FIGS. 4 and 5, in order to simplify the drawing, only the detectable area of the camera 16a and the detectable area of the radar sensor 17a are illustrated, and the detectable areas of the radar sensors 17b and 17c are omitted.

As illustrated in FIG. 4, it is assumed that the own vehicle SV is traveling in a first direction D1, and an other vehicle OV is traveling in front of the vehicle SV and in a second direction D2 orthogonal to the first direction D1. At this time point, only a front part 401 of the other vehicle OV is within the camera detection area. Therefore, the image processor of the camera sensor 16 has detected the front part 401 of the other vehicle OV as the object (c). The radar sensor 17a does not acquire the reflection point information on the front part 401 of the other vehicle OV, but acquires only the reflection point information on a part (center side portion of a vehicle body) other than the front part 401. The information processor of the radar sensor 17a has detected a group of reflection points 202 obtained from the center side portion of the vehicle body of the other vehicle OV as the object (r). In such a situation, when the control ECU 10 sets, as the FSN region, the camera object region 201 representing a region where the object (c) is present, the group of reflection points 202 corresponding to the object (r) is not included in the FSN region. Thus, the control ECU 10 determines that there is no fusion object (f). Even if there is a high possibility that the own vehicle SV collides with the other vehicle OV (TTC for the other vehicle OV is equal to or shorter than time threshold Tth), the PCS control is not executed.

In view of the above, the control ECU 10 determines whether or not a predetermined condition (hereinafter, referred to as a "specific condition") is satisfied. This specific condition is satisfied when the camera-detected object (c) is an object which enters the camera detection region from outside of there as illustrated in FIG. 5. When the specific condition is satisfied, there is a high possibility that only a part of the object (c) is present within the camera detection region, and many parts of the object (c) are present outside of the camera detection region. Therefore, the control ECU 10 sets a specific region 501 as the FSN region. The specific region 501 is a region which includes the camera detection region, and further includes a part of a region outside of the camera detection region. The specific region 501 is a region obtained by enlarging the camera object region 201 from a position at which the object (c) enters the camera detection region to the outside of the camera detection region (in a direction opposite to the moving direction D2 of the object (c)).

When the specific region 501 is set as the FSN region, the group of reflection points 202 forming the object (r) to be regarded as the same object as the object (c) is included in the FSN region. Therefore, the control ECU 10 can recognize the combination of the object (c) and the object (r) as the fusion object (f). When there is a high possibility that the vehicle SV collides with the fusion object (f) (that is, TTC for the fusion object (f) is equal to or shorter than the time threshold Tth), the control ECU 10 executes the PCS control. Accordingly, since the PCS control is executed at the time point at which the part of the other vehicle OV enters the camera detection region, it is possible to prevent the own vehicle SV from moving closer to the other vehicle OV.

<Operation>

Next, the operation of the apparatus will be described. The CPU (hereinafter simply referred to as "CPU") of the control ECU 10 is configured to, each time a predetermined time (hereinafter also referred to as "first time" for the sake of convenience) elapses, execute a routine (not shown) to acquire the camera-sensor detection information from the camera sensor 16 and acquire the radar-sensor detection information based on the information acquired from each of the radar sensors 17. The CPU is configured to store those pieces of information (the camera-sensor detection information and the radar-sensor detection information) in the RAM. Further, each time the CPU acquires the camera-sensor detection information (that is, for each object (c)), the CPU is configured to execute a "fusion object detection routine" illustrated in FIG. 6 as a flowchart.

Figure 6:
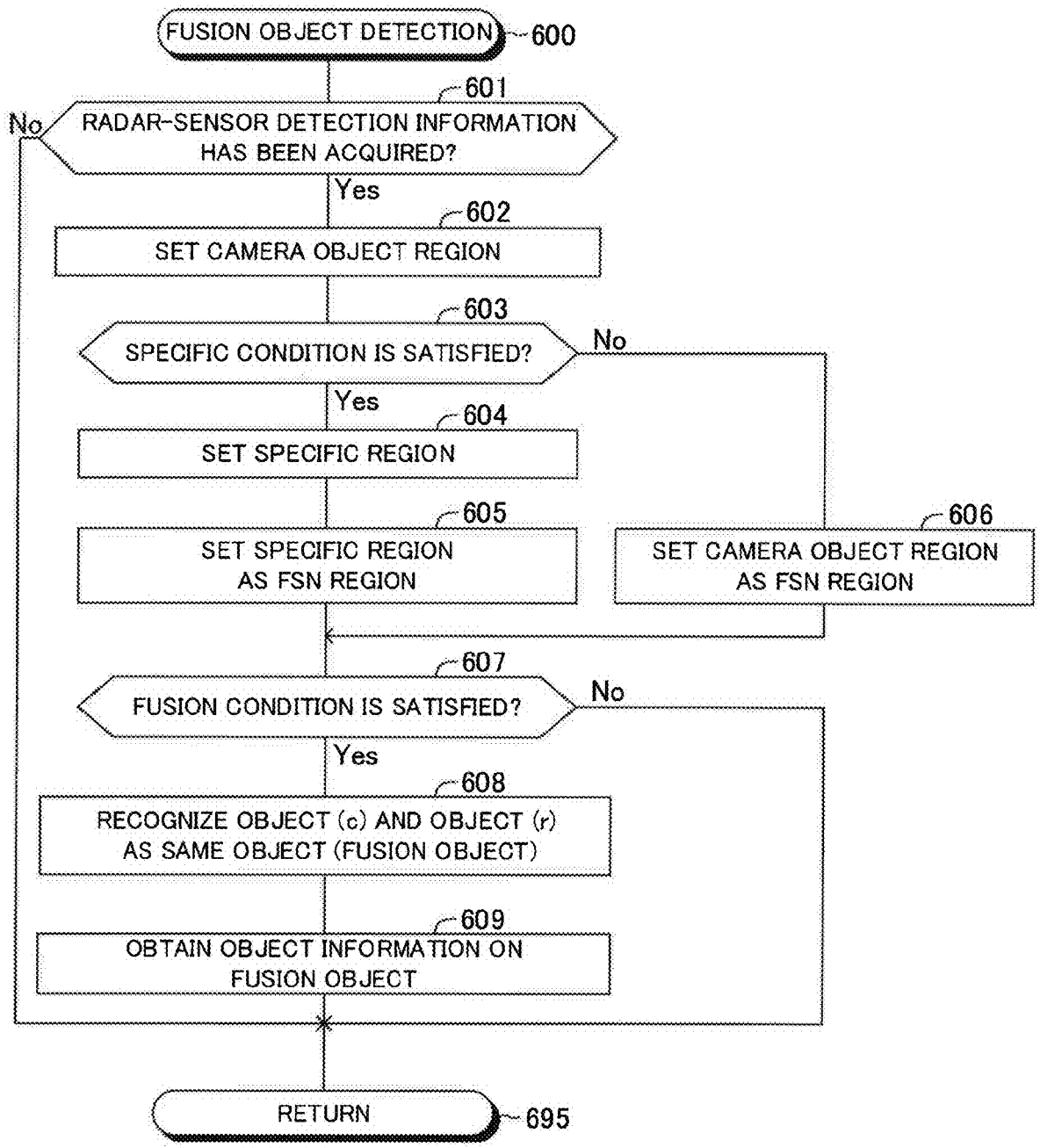
FIG. 6 is a flowchart for illustrating a "fusion object detection routine" to be executed by a CPU of a control ECU illustrated in FIG. 1.

As the CPU acquires the camera-sensor detection information from the camera sensor 16, the CPU starts the processing from Step 600 of FIG. 6, and proceeds to Step 601. In Step 601, the CPU determines whether or not the radar-sensor detection information has been acquired at the present time. That is, the CPU determines whether or not the object (r) has been detected. When no object (r) has been detected, the CPU makes a "No" determination in Step 601, and proceeds directly to Step 695 to tentatively terminate this routine.

It is assumed that the present situation is the situation as illustrated in FIG. 5. Since the object (r) has been detected, the CPU makes a "Yes" determination in Step 601, and proceeds to Step 602. In Step 602, the CPU sets/defines, based on the camera-sensor detection information, the camera object region 201 representing a region in which the object (c) exists.

Next, the CPU proceeds to Step 603 to determine whether or not the specific condition is satisfied. The specific condition is a condition satisfied when the object (c) is a relatively large object (e.g., four-wheel vehicle), and the object (c) is an object which enters the camera detection region from outside of there. More specifically, the specific condition is satisfied when all the following Conditions A1 to A3 are satisfied.

(Condition A1): The category of the object (c) is the "four-wheel vehicle".

(Condition A2): The camera object region 201 is present in a predetermined right edge region or a predetermined left edge region. The right edge region is a fan-shaped region formed by a "right-side detection axis RCAL set between the detection axis CSL and the right boundary line RCBL" and the "right boundary line RCBL" (see FIG. 5). The right-side detection axis RCAL is an axis extending from the central position in the vehicle-width direction of the front part of the vehicle SV in a right front direction of the vehicle SV. An angle between the right-side detection axis RCAL and the right boundary line RCBL is an angle (e.g., 2·θc/3) smaller than θc. The left edge region is a fan-shaped region formed by a "left-side detection axis LCAL set between the detection axis CSL and the left boundary line LCBL" and the "left boundary line LCBL" (see FIG. 5). The left-side detection axis LCAL is an axis extending from the central position in the vehicle-width direction of the front part of the vehicle SV in a left front direction of the vehicle SV. An angle between the left-side detection axis LCAL and the left boundary line LCBL is an angle (e.g., 2·θc/3) smaller than θc. When a part of the camera object region 201 is included in a predetermined central region, Condition A2 is not satisfied. The central region is a fan-shaped region formed by the right-side detection axis RCAL and the left-side detection axis LCAL.

(Condition A3): A first half line extending from the current position of the object (c) in the moving direction of the object (c) intersects with a second half line extending from the current position of the vehicle SV in the moving direction of the vehicle SV.

In the situation illustrated in FIG. 5, the specific condition is satisfied. Therefore, the CPU makes a "Yes" determination in Step 603, and executes the processing of Step 604 and Step 605 (described below) in sequence. Thereafter, the CPU proceeds to Step 607.

Step 604: The CPU sets the specific region 501 as described above. The specific region 501 is a region obtained by enlarging the camera object region 201 such that the first sides 201a become longer by a length Ln in the direction opposite to the moving direction (D2) of the object (c) (see FIG. 5). The length Ln is a predetermined length within a range of 3 m to 5 m, for example. In other words, the specific region 501 is a region which includes the camera object region 201, and which further includes a part of a region contiguous to the camera object region 201 and outside of the camera detection region.

Step 605: The CPU sets the specific region 501 as the FSN region.

As the CPU proceeds to Step 607, the CPU determines whether or not a predetermined fusion condition is satisfied. The fusion condition is satisfied when at least part of the object (r) (that is, at least part of the group of reflection points 202) is included in the FSN region. In this case, the CPU determines whether or not at least part of the object (r) is present within the specific region 501 (=the FSN region). In the situation illustrated in FIG. 5, the fusion condition is satisfied. Therefore, the CPU makes a "Yes" determination in Step 607, and executes the processing of Step 608 and Step 609 (described below) in sequence. Thereafter, the CPU proceeds to Step 695 to tentatively terminate this routine.

Step 608: The CPU recognizes the object (c) and the object (r) as the same object (that is, the fusion object (f)). The CPU assigns an object ID (that is, ID(f)), which is identification information for identifying the fusion object (f), to the fusion object (f).

Step 609: The CPU integrates the camera-sensor detection information and the radar-sensor detection information (that is, executes the fusion processing) to thereby obtain the object information on the fusion object (f). The CPU stores the object information on the fusion object (f) in the RAM in association with the object ID (that is, ID (f)).

On the other hand, when the fusion condition is not satisfied at the time point at which the CPU proceeds to Step 607, the CPU makes a "No" determination in Step 607, and proceeds directly to Step 695 to tentatively terminate this routine.

Figure 8:
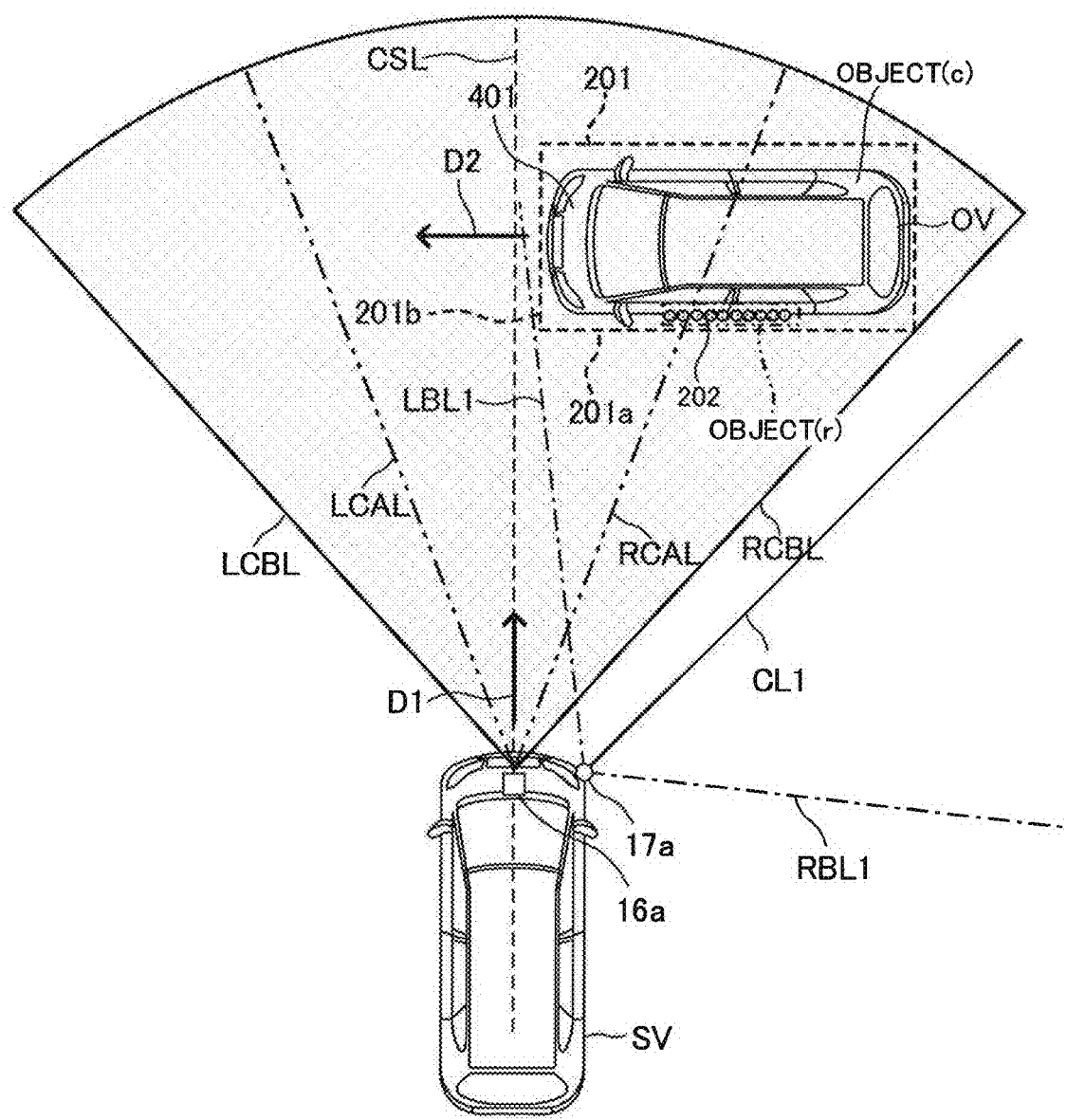
FIG. 8 is a diagram for illustrating a situation in which the other vehicle enters the front region of the own vehicle from the side, and the whole of the other vehicle is included in the camera detection area.

It is assumed that the present situation is the situation illustrated in FIG. 8. As the CPU starts the routine of FIG. 6 from Step 600 in this situation, the CPU makes a "Yes" determination in Step 601, and proceeds to Step 602 to set the camera object region 201. In the situation illustrated in FIG. 8, the whole of the other vehicle OV is included in the camera detection region, and therefore, the camera object region 201 is set so as to surround the whole of the other vehicle OV.

Next, the CPU proceeds to Step 603. In this case, since the above-mentioned Condition A2 is not satisfied, the specific condition is not satisfied. The CPU makes a "No" determination in Step 603, and proceeds to Step 606. In Step 606, the CPU sets the camera object region 201 as the FSN region.

Next, in Step 607, the CPU determines whether or not the fusion condition is satisfied. In this case, the CPU determines whether or not at least part of the object (r) is included in the camera object region 201. In the situation illustrated in FIG. 8, the object (r) (that is, the group of reflection points 202) is included in the FSN region (=the camera object region 201), and therefore, the fusion condition is satisfied. The CPU makes a "Yes" determination in Step 607, and executes the processing of Step 608 and Step 609 in sequence as described above. Thereafter, the CPU proceeds to Step 695 to tentatively terminate this routine.

Figure 7:
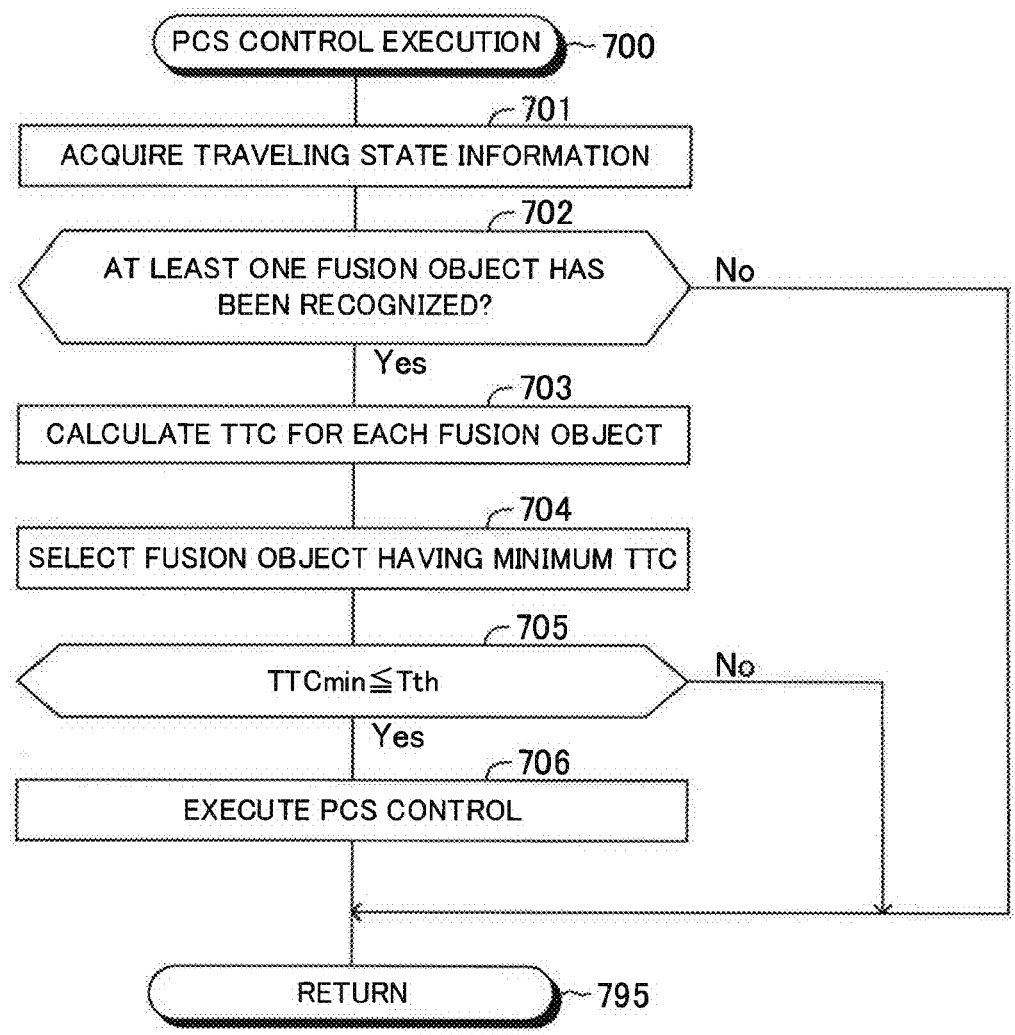
FIG. 7 is a flowchart for illustrating a "pre-collision safety control (PCS control) execution routine" to be executed by the CPU of the control ECU.

Furthermore, the CPU is configured to execute a "PCS control execution routine" illustrated in FIG. 7 as a flowchart each time a "predetermined second time equal to or longer than the first time" elapses.

When a predetermined timing is reached, the CPU starts the processing from Step 700 of FIG. 7, and proceeds to Step 701. In Step 701, the CPU acquires the traveling state information (including the accelerator pedal operation amount AP, the brake pedal operation amount BP, the vehicle speed SPD, the actual yaw rate YRt, and the like).

Next, the CPU proceeds to Step 702, and determines whether or not at least one fusion object has been recognized at the present time. When no fusion object has been recognized, the CPU makes a "No" determination in Step 702, and proceeds directly to Step 795 to tentatively terminate this routine.

On the other hand, when at least one fusion object has been recognized, the CPU makes a "Yes" determination in Step 702, and executes the processing of Step 703 and Step 704 (described below) in sequence. Thereafter, the CPU proceeds to Step 705.

Step 703: The CPU calculates the collision prediction time TTC for each fusion object (that is, each object ID) based on the traveling state information and the object information on the fusion object (f) (that is, the object information obtained in Step 609 in the routine of FIG. 6). In one example, based on the traveling direction of the vehicle SV and the moving directions of the fusion objects, the CPU may extract from among the recognized fusion objects only objects having a possibility of collision with the vehicle SV (e.g., objects which are present in an area where the vehicle SV will travel). In this example, the CPU calculates the collision prediction time TTC for each of the extracted fusion objects.

Step 704: The CPU selects a fusion object having the shortest collision prediction time TTC among the collision prediction times TTC calculated in Step 703. Hereinafter, the fusion object selected in this step is referred to as a "selected object". Furthermore, the collision prediction time TTC of the selected object is denoted as "$TTC_{min}$".

Next, in Step 705, the CPU determines whether or not the collision prediction time $TTC_{min}$ of the selected object is equal to or shorter than the time threshold Tth. When the collision prediction time $TTC_{min}$ is not equal to or shorter than the time threshold Tth, the CPU makes a "No" determination in Step 705, and proceeds directly to Step 795 to tentatively terminate this routine. In this case, the PCS control is not executed.

On the other hand, when the collision prediction time $TTC_{min}$ is equal to or shorter than the time threshold Tth, the CPU makes a "Yes" determination in Step 705, and proceeds to Step 706 to execute the PCS control as describe above. Thereafter, the CPU proceeds to Step 795 to tentatively terminate this routine.

As described above, in the situation in which the other vehicle OV enters the front region of the vehicle SV from the side, the apparatus according to this embodiment sets the specific region 501 as the FSN region at the time point at which the part (front part) of the other vehicle OV enters the camera detection region (see FIG. 5). The specific region 501 is a region which includes the camera object region 201, and which further includes a part of a region contiguous to the camera object region 201 and outside of the camera detection region. According to the apparatus, it is possible to increase the possibility of including in the FSN region the radar-detected object (r) (that is, the group of reflection points 202 obtained from the center side portion of the other vehicle OV) which should be regarded as the same object as the camera-detected object (c). As a result, the apparatus recognizes as the fusion object (f) the other vehicle OV of which only the front part enters the camera detection region to thereby execute the PCS control. Therefore, in the situation in which the other vehicle OV enters the camera detection region from the side, the apparatus can execute the PCS control at a relatively early point (that is, at the time point at which only the part of the other vehicle OV enters the camera detection region). In this manner, the apparatus can execute the PCS control for preventing the vehicle SV from moving closer to the other vehicle OV.

Figure 9:
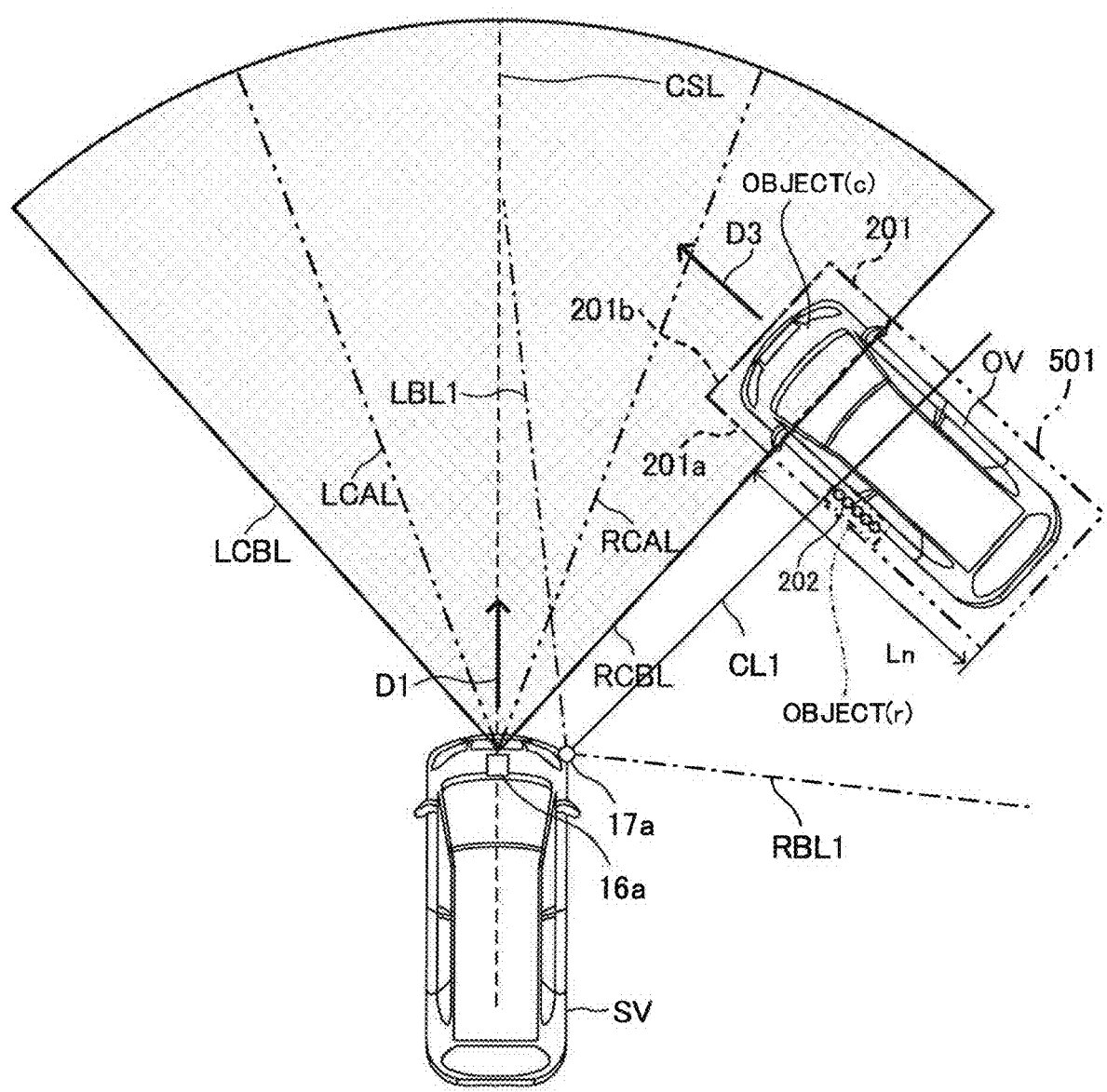
FIG. 9 is a diagram for illustrating a situation in which the other vehicle enters the front region of the own vehicle from diagonally behind the own vehicle, and only a part of the other vehicle is included in the camera detection area.

Further, the apparatus sets as the specific region 501 the region obtained by enlarging the camera object region 201 in the direction opposite to the moving direction D2 of the object (c). As illustrated in FIG. 5, at the time point at which the part of the other vehicle OV enters the camera detection region, the remaining part of the other vehicle OV is present so as to extend from the position where the other vehicle OV enters the camera detection region in the direction opposite to the moving direction (D2) of the other vehicle OV. The apparatus enlarges the camera object region 201 from the position where the other vehicle OV enters the camera detection region in an appropriate direction in accordance with the moving direction of the other vehicle OV to thereby set the specific region 501. As illustrated in FIG. 9, even in a situation in which the other vehicle OV enters the front region of the vehicle SV from diagonally behind the vehicle SV, the apparatus can enlarge the camera object region 201 in an appropriate direction. In the situation illustrated in FIG. 9, the apparatus enlarges the camera object region 201 such that the first sides 201a become longer by the length Ln in a direction opposite to the moving direction (D3) of the object (c) to thereby set the enlarged region as the FSN region. According to the apparatus, it is possible to increase the possibility that at least part of the object (r) (that is, at least part of the group of reflection points 202) to be regarded as the same object as the object (c) is included in the specific region 501 (=the FSN region).

The present disclosure is not limited to the embodiment described above, and various modification examples can be adopted within the scope of the present disclosure.

Modification Example 1

In the case where the category of the object (c) is the two-wheel vehicle, the CPU of the control ECU 10 may set the specific region 501 and set the specific region 501 as the FSN region. In this configuration, Condition A1 of the specific condition is replaced with the following Condition A1'.

(Condition A1'): The category of the object (c) is the four-wheel vehicle or the two-wheel vehicle.

Further, in Step 604 in the routine of FIG. 6, the CPU may change the length Ln for enlarging the camera object region 201 in accordance with the category of the object (c). For example, when the category of the object (c) is the two-wheel vehicle, the CPU may set the length Ln to a first length L1. The first length L1 is a predetermined length within a range of 1 m to 2 m, for example. When the category of the object (c) is the four-wheel vehicle, the CPU may set the length Ln to a second length L2 longer than the first length L1. The second length L2 is a predetermined length within a range of 3 m to 5 m, for example. In this manner, the control ECU 10 according to the present modification example can change the size of the region outside of the camera detection region in the specific region 501 in accordance with the category of the object (c).

For example, the radar sensors 17 may detect an object (also referred to as "ghost object") that does not actually exist, due to multiple reflections of the transmitted millimeter wave and/or the reflected wave from the object. When the size of the region outside of the camera detection region in the specific region 501 is too large, there is a possibility that the object (ghost object) (r) which should not be regarded as the same object as the object (c) is included in the specific region 501. According to the present modification example, the size of the specific region 501 is set to an appropriate size in accordance with the category of the object (c). Therefore, it is possible to reduce the possibility that the object (ghost object) (r) which should not be regarded as the same object as the object (c) is included in the specific region 501. As a result, it is possible to avoid the execution of the PCS control in an unnecessary situation (that is, a situation in which no fusion object exists).

Further, the image processor of the camera sensor 16 may store data obtained by patterning typical vehicles (medium-sized vehicles such as a passenger vehicle) and large-sized vehicles (for example, a bus and a truck) in the memory (for example, the ROM) in advance. In this configuration, the image processor performs the pattern matching on the image data to determine/distinguish whether the object (c) is the medium-sized vehicle or the large-sized vehicle. In Step 604 in the routine of FIG. 6, the CPU of the control ECU 10 may change the length Ln for enlarging the camera object region 201 in accordance with the category of the object (c). When the category of the object (c) is the medium-sized vehicle, the CPU may set the length Ln to the second length L2. When the category of the object (c) is the large-sized vehicle, the CPU may set the length Ln to a third length L3 longer than the second length L2. The third length L3 is a predetermined length within a range of 5 m to 10 m, for example.

For example, in a situation in which a large-sized vehicle (bus) enters the front region of the vehicle SV from the side, the radar sensors 17 may acquire the reflection point information only from a rear part of the large-sized vehicle. In this situation, when the size of the region outside of the camera detection region in the specific region 501 is small, the object (r) (that is, the group of reflection points obtained from the rear part of the large-sized vehicle) is not included in the FSN region. Even in the situation in which there is a high possibility that the vehicle SV collides with the large-sized vehicle, the PCS control is not executed. The apparatus according to the present modification example can recognize the object (c) and the object (r) as the same object (fusion object (f)) in the above-mentioned situation. Therefore, the apparatus executes the PCS control to thereby avoid a collision of the vehicle SV with the large-sized vehicle.

Modification Example 2

Figure 10:
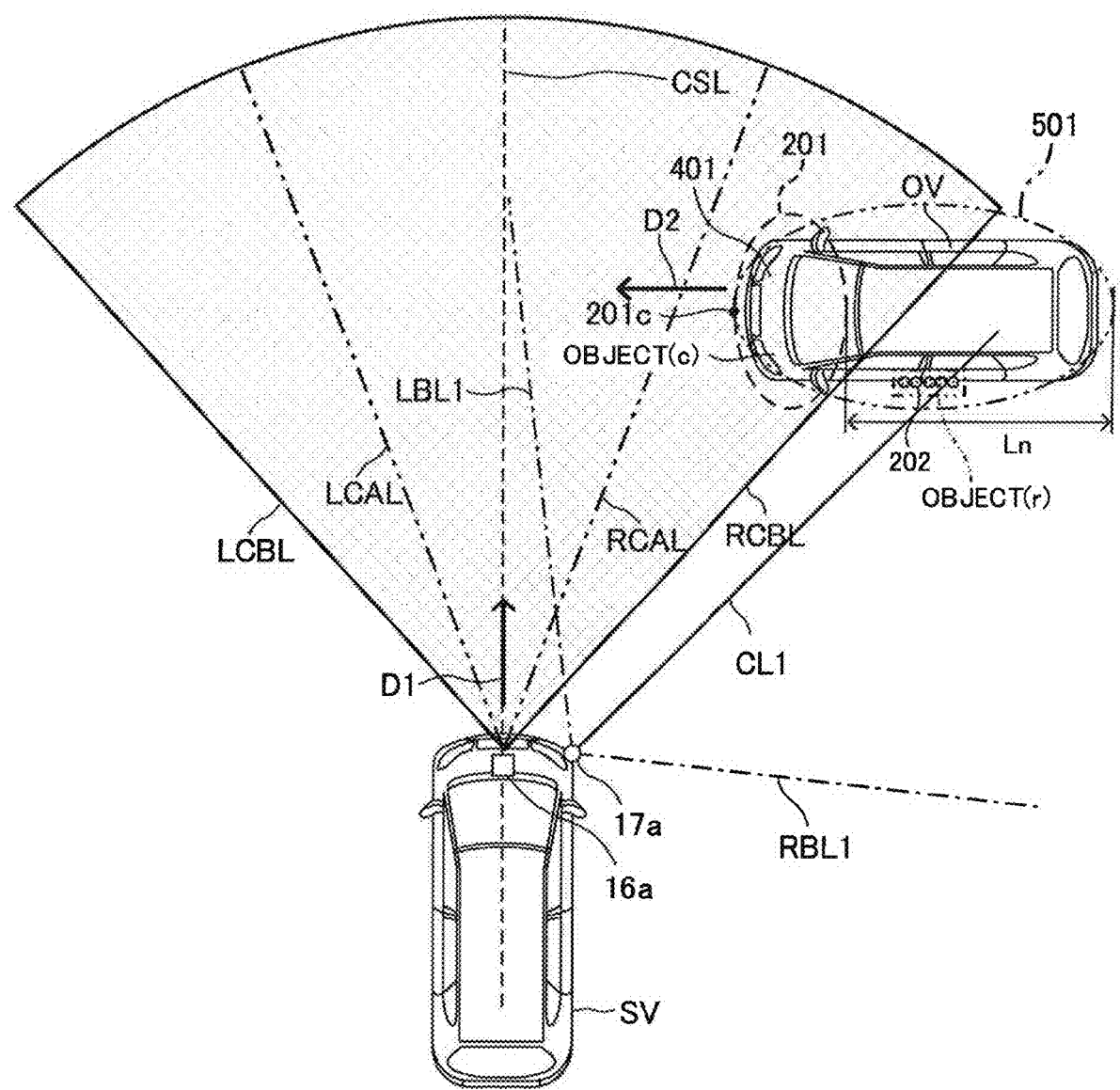
FIG. 10 is a diagram for illustrating a camera object area and a specific region to be set by the control ECU according to a modification example.

The shape of the camera object region 201 may be a shape (for example, circle or ellipse) other than the rectangle. When the shape of the camera object region 201 is an ellipse, in Step 604 in the routine of FIG. 6, the CPU may set the specific region 501 as illustrated in FIG. 10. Specifically, the CPU may set the specific region 501 such that a minor axis of the ellipse is enlarged by the length Ln without changing the position of an "edge point 201c on the moving direction (D2) side of the object (c)" in the camera object region 201. The edge point 201c refers to an intersection of the circumference of the ellipse and the minor axis thereof.

Modification Example 3

Figure 11:
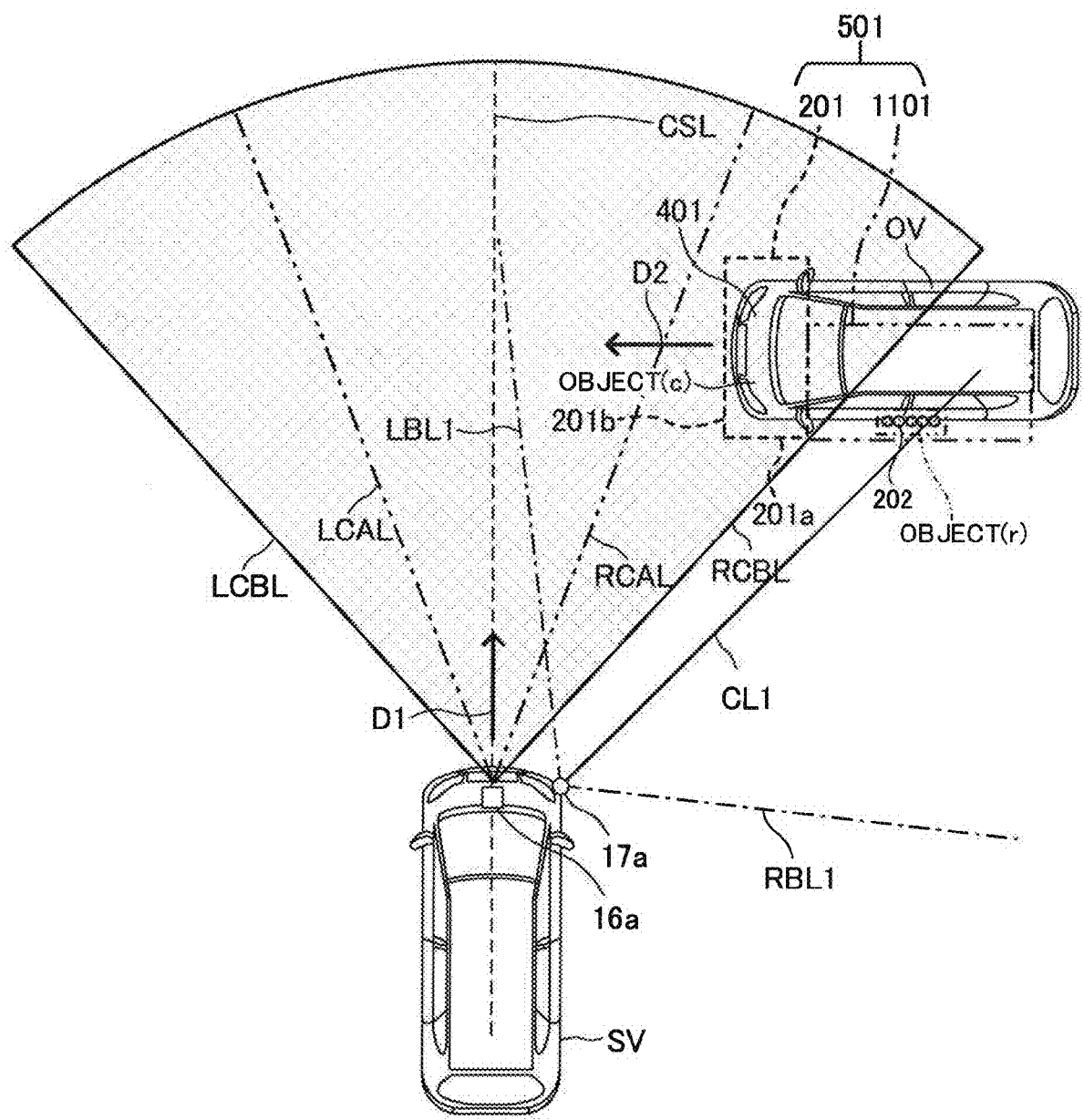
FIG. 11 is a diagram for illustrating the specific region to be set by the control ECU according to a modification example.

The specific region 501 is not limited to the above-mentioned example. The specific region 501 may be set according to another method as long as the specific region 501 includes the camera object region 201, and includes a part of a region contiguous to the camera object region 201 and outside of the camera detection region. For example, as illustrated in FIG. 11, in Step 604 in the routine of FIG. 6, the CPU may arrange a predetermined rectangular region 1101 so as to be adjacent to the camera object region 201, and set a region obtained by combining the camera object region 201 and the rectangular region 1101 as the specific region 501. The rectangular region 1101 is arranged on the opposite side to the moving direction (D2) side of the object (c) with respect to the camera object region 201. In addition, the rectangular region 1101 is arranged such that the extending direction of the major axis thereof coincides with the moving direction (D2) of the object (c).

Modification Example 4

Figure 12:
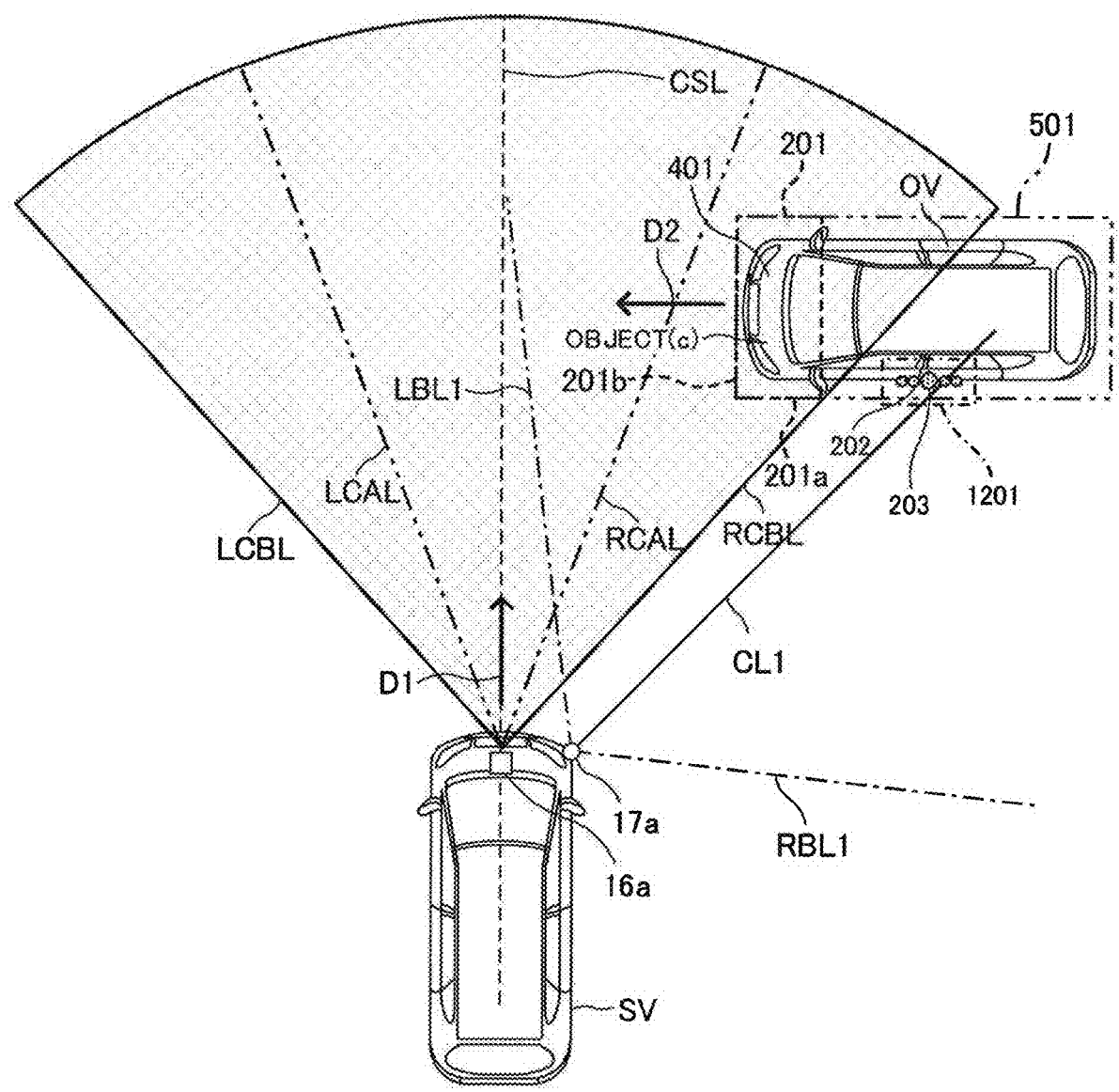
FIG. 12 is a diagram for illustrating a radar object region to be set by the control ECU according to a modification example.

The fusion condition in Step 607 in the routine of FIG. 6 is not limited to the above-mentioned example. As illustrated in FIG. 12, the CPU may set a rectangular region surrounding the group of reflection points 202 as a radar object region 1201. In this configuration, the CPU determines that the fusion condition is satisfied when at least part of the radar object region 1201 overlaps with the FSN region (in this example, the specific region 501). The CPU may set the radar object region 1201 so as to center the representative reflection point 203 among the group of reflection points 202 and have a predetermined size. The shape of the radar object region 1201 may be a shape (for example, circle or ellipse) other than the rectangle.

Modification Example 5

In Step 609 in the routine of FIG. 6, the CPU may obtain the object information on the fusion object (f) based on any one of the radar-sensor detection information and the camera-sensor detection information.

Modification Example 6

The PCS control is not limited to the above example. In one aspect, the PCS control may be control including at least the braking force control. In one aspect, the PCS control may be control including at least the warning control. In one aspect, the PCS control may include seat belt control (safety belt control) in addition to the braking force control or the warning control. In this aspect, the control ECU 10 is connected to a seat belt actuator (not shown). The seat belt actuator is an actuator for fastening the seat belt more strongly to thereby reduce slack of the seat belt. Upon receiving an instruction signal from the control ECU 10, the seat belt actuator executes the seat belt control for fastening the seat belt.

What is claimed is:

1. A collision avoidance control apparatus for a vehicle, comprising:
   a first sensor configured to capture a predetermined first area in a peripheral region of the vehicle to acquire image data, detect as a first object an object present in the first area through use of the image data, and acquire first detection information which is information on the detected first object;
   a second sensor configured to, through use of an electromagnetic wave, detect as a second object an object present in a predetermined second area in the peripheral region of the vehicle, and acquire second detection information which is information on the detected second object, the second area including the first area and being larger than the first area; and
   a controller configured to execute collision avoidance control for avoiding a collision when determining the first object and the second object as the same object based on the first detection information and the second detection information, and determining the first object as an obstacle which is likely to collide with the vehicle based on one or both of the first detection information and the second detection information,
   wherein:
   the controller is further configured to
      determine whether or not a specific condition is satisfied based on the first detection information, the specific condition being satisfied when the first object enters the first area from outside of the first area,
      determine the first object and the second object as the same object when determining that the specific condition is not satisfied, and determining that at least part of the second object is present in a first object region in which the first object exists, and
      determine the first object and the second object as the same object when determining that the specific condition is satisfied, and determining that at least part of the second object is present in a specific region, the specific region being a region which includes the first object region, and which includes a part of a region contiguous to the first object region and outside of the first area.

2. The collision avoidance control apparatus according to claim 1, wherein the controller is configured to set as the specific region a region obtained by enlarging the first object area in a direction opposite to a moving direction of the first object.

3. The collision avoidance control apparatus according to claim 2, wherein the first sensor is configured to determine a category of the first object based on the image data, and
   the controller is configured to change a size of a region outside of the first area in the specific region in accordance with the determined category of the first object.

4. The collision avoidance control apparatus according to claim 1, wherein the first sensor is configured to determine a category of the first object based on the image data, and
   the controller is configured to change a size of a region outside of the first area in the specific region in accordance with the determined category of the first object.

* * * * *